(12) United States Patent
Brooks (10) Patent No.: US 7,058,400 B2
(45) Date of Patent: Jun. 6, 2006

(54) FORWARD AND REVERSE LINK CHANNELS DYNAMIC PROCESSING GAIN

(75) Inventor: Frank P. Brooks, Vista, CA (US)

(73) Assignee: Denso Corporation, Kariya (JP)

( * ) Notice: Subject to any disclaimer, the term of this patent is extended or adjusted under 35 U.S.C. 154(b) by 439 days.

(21) Appl. No.: 10/172,677

(22) Filed: Jun. 14, 2002

(65) Prior Publication Data

US 2003/0232621 A1  Dec. 18, 2003

(51) Int. Cl.
*H04Q 7/20* (2006.01)

(52) U.S. Cl. .................. 455/424; 455/522; 455/69; 370/333

(58) Field of Classification Search ........ 455/423–424, 455/425, 522, 67.11, 67.14, 67.16, 68–69, 455/115.1–115.4, 226.1–226.4; 370/333
See application file for complete search history.

(56) References Cited

U.S. PATENT DOCUMENTS 5,841,806 A * 11/1998 Gilhousen et al. .......... 375/146
6,169,763 B1 * 1/2001 Woodward et al. ......... 375/224
2003/0078010 A1 * 4/2003 Davis .......................... 455/69

* cited by examiner

*Primary Examiner*—Duc Nguyen
(74) *Attorney, Agent, or Firm*—Morrison & Foerster LLP (57) ABSTRACT

A method and apparatus for dynamically controlling forward and reverse link channel processing gain to minimize dropped connections and improve the reliability of hard handoffs is disclosed. The transmission bit stream of a forward or reverse link channel is allowed to become dynamic under controlled conditions in such a way as to take advantage of the inherit strengths that the concept of processing gain provides and thereby improve the probability of establishing and maintaining a forward or reverse link traffic channel. Dropped connections due to reverse link fades and dropped connections during call origination are minimized by allowing a MS to transmit reverse traffic channel data using dynamically adjustable data rates to increase the processing gain and the effective transmit power level. In addition, dropped connections during hard handoffs are minimized by using a special code channel and dynamically adjustable data rates to evaluate the proposed new link.

9 Claims, 7 Drawing Sheets

FORWARD AND REVERSE LINK CHANNELS DYNAMIC PROCESSING GAIN

BACKGROUND OF THE INVENTION

1. Field of the Invention

The present invention relates, generally, to communication network management and, in one embodiment, to a method and apparatus for dynamically controlling forward and reverse link channel processing gain to minimize dropped connections and improve the reliability of hard handoffs.

2. Description of Related Art

Introduction

Rather than just providing a means for emergency communications, cellular telephones are rapidly becoming a primary form of communication in today's society. As cellular telephone usage becomes widespread, cellular communication networks are becoming increasingly prevalent and are providing coverage over larger areas to meet consumer demand.

Figure 1:
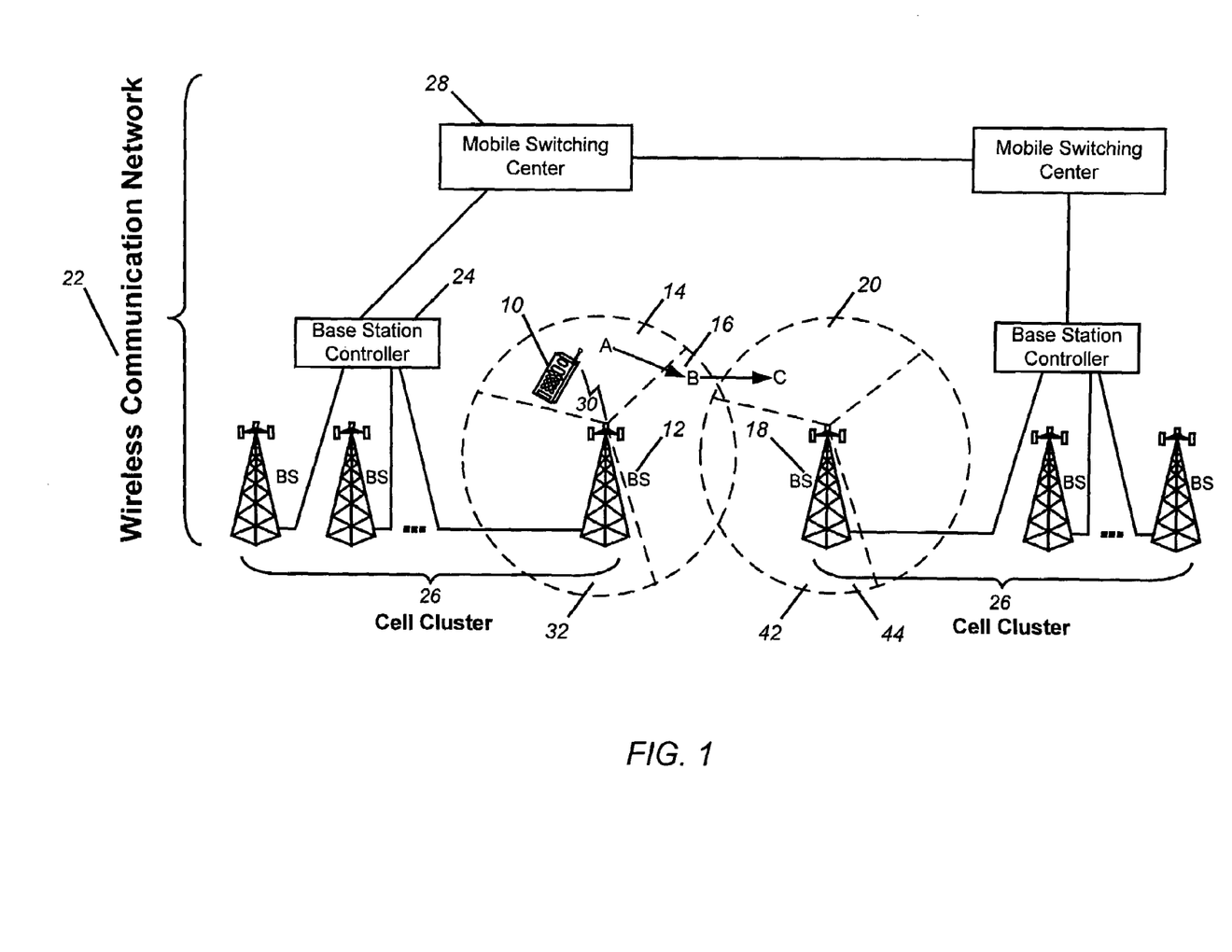
FIG. 1 illustrates an example system environment including a mobile station capable of maintaining a connection with a cellular communication network as the mobile station roves through a geographic area served by the cellular communication network.

FIG. 1 illustrates an example system environment including a mobile station (MS) 10 capable of maintaining a call or connection 30 with a cellular communication network 22 as the MS 10 roves through a geographic area served by the cellular communication network 22. It should be understood that a call or connection, as referred to herein, includes, but is not limited to, voice, multimedia video or audio streaming, packet switched data and circuit switched data connections, short message sequences or data bursts, and paging. The cellular communication network 22 includes a first base station (BS) 12 communicating over sectors 14, 16 and 32, and a second BS 18 communicating over sectors 20, 42 and 44. A BS is typically comprised of multiple sectors, usually three. Each BS includes a separate transmitter and antenna (transceiver) for each sector, pointed in the direction of the sector. Because a BS can be omni or sectorized, it should be understood that the terms BS and sector may be used interchangeably herein. Furthermore, when referring to access to a network via a network access point, the terms BS, sector, and network may be used interchangeably herein. The BSs are connected to network infrastructure entities including BS controllers (BSC) 24 that may control a cell cluster 26, and communicate with a mobile switching center (MSC) 28. It should be understood that the MS 10 and one or more of these network infrastructure entities contain one or more processors for controlling communications between the MS 10 and the network 22. The processors include memory and other peripheral devices well understood by those skilled in the art.

In the course of roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of sector 14 to the area defined by the dotted line of sector 16, or from sector 16 to sector 20. It is in these transition areas, as well as other areas of weak signal strength or quality, where poor or dropped connections are likely to occur.

Poor connections between the MS 10 and the network 22 result in the improper transmission of information. For example, if information is communicated in discrete packets such as messages or frames, a poor connection can lead to message or frame errors and the receipt of bad messages or frames. Dropped connections can range from being a nuisance to devastating for cellular telephone users. For example, a dropped emergency 911 connection can be critical or even fatal. Poor and dropped connections can create consumer frustration significant enough to cause the consumer to change service providers. Thus, the prevention of poor and dropped connections is of major importance to cellular network providers.

Cellular Communication Links

Figure 2:
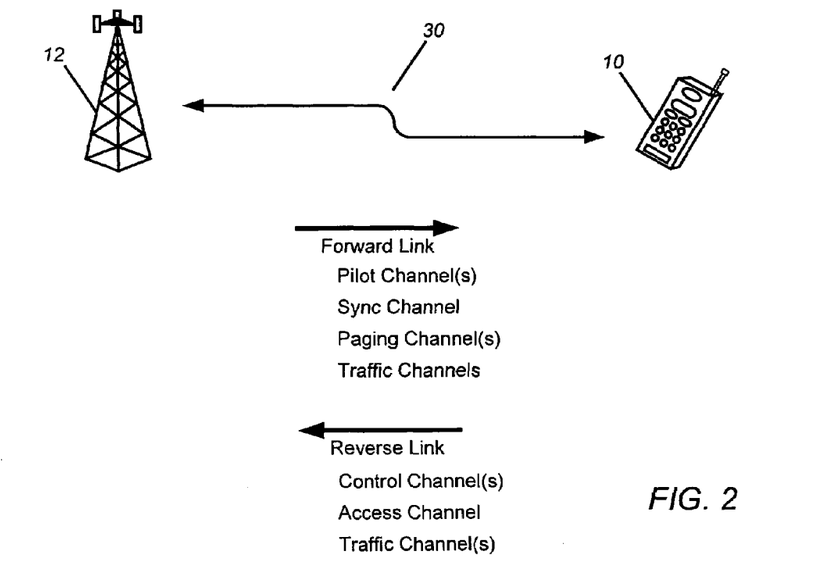
FIG. 2 illustrates an exemplary communication link between a mobile station and a base station in a wireless communication system.

FIG. 2 illustrates an exemplary communication link 30 between a MS 10 and a BS 12. Communications from the BS 12 to the MS 10 are called the forward link, and communications from the MS 10 to the BS 12 are called the reverse link. The forward and reverse links utilize a number of forward and reverse channels. For example, the BS 12 communicates with the MSs using a plurality of forward common channels or links which may include, but are not limited to, one or more pilot channels, a sync channel, and one or more paging channels, discussed in greater detail below. These channels are referred to as common channels because the BS 12 may communicate those channels to all MSs in the network. Generally, these common channels are not used to carry data, but are used to broadcast and deliver common information.

Each sector within BS 12 broadcasts a pilot channel that identifies that sector and is simple for a MS 10 to decode. Both sectors and pilot channels are distinguished by pseudo-noise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel from a BS. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 12 communicates with individual MSs using a plurality of forward dedicated channels or links which may include, but are not limited to, multiple traffic channels, multiple supplemental channels, and control channels. These channels are referred to as dedicated channels because the BS communicates the channels to a specific MS 10, and the channels may carry data.

The reverse channels or links may include an access channel and one or more reverse traffic channels and control channels. After a MS receives an incoming page from a BS, the MS will initiate a connection setup using, in part, an access channel. These reverse channels will be discussed in further detail below.

Cellular Network Communication Schemes

The previously described channels may employ different separation schemes of multiple access methods. In time division multiple access (TDMA), multiple channels may be communicated at a particular frequency, each channel using a specified time window. Thus, for example, channel X may use one set of time slots while channel Y may use a different set of time slots. In frequency division multiple access (FDMA), multiple channels are defined as specific frequencies transmitted within a particular time slot.

Code division multiple access (CDMA) is a spread-spectrum multiple-access digital communications technique that creates channels through the use of unique binary code sequences. It allows a number of MSs to communicate with one or more BSs in neighboring cell sites, simultaneously using the same frequency. In CDMA, all transmissions occur on specified frequencies, with each channel being assigned a particular orthogonal code such as a Walsh code or a quasi-orthogonal function (QOF). For example, a Walsh code of 0 may be assigned to the pilot channel, a Walsh code of 32 may be assigned to the sync channel, and Walsh codes of 1–7 may be assigned to paging channels (1–7). Other Walsh codes are similarly reserved for data and voice channels.

In direct sequence CDMA, the data from each channel is coded using Walsh codes or QOFs and then combined into a composite signal. This composite signal is spread over a wide frequency range at a particular time. When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

The CDMA wireless communication system is fully described by a number of standards, which include, but are not limited to those listed below, all of which are published by the TELECOMMUNICATIONS INDUSTRY ASSOCIATION, Standards & Technology Department, 2500 Wilson Blvd., Arlington, Va. 22201, and all of which are herein incorporated by reference:

| CDMA/WCDMA Standard | Publication date |
| --- | --- |
| TIA/EIA-95A | 1993 |
| TIA/EIA-95B | Feb. 1, 1999 |
| TIA/EIAI/S-2000, Volumes 1–5, Release A | Mar. 1, 2000 |
| TIA/EIA-98D | Jun. 1, 2001 |
| 3GPP TS 25.214 V4.2.0 | September 2001 |
| T525.401 V5.1.0 | September 2001 |
| TR 25.922 V4.1.0 | Oct. 2, 2001 |
| TS 25.331 V4.2.0 | Oct. 8, 2001 |

Frames and Slots

Figure 3:
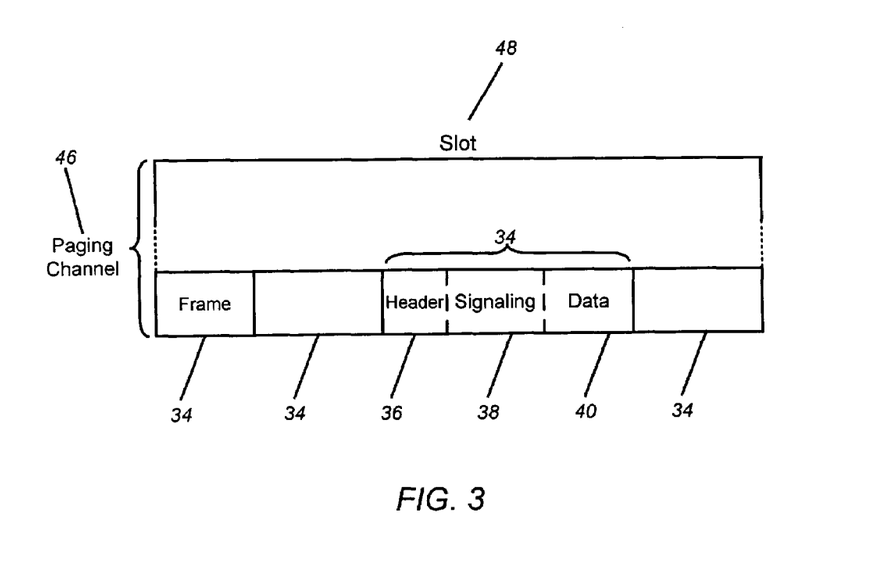
FIG. 3 is a timeline of a paging channel slot divided into four frames for use in a wireless communication system.

As illustrated in FIG. 3, a paging channel, which may be assigned to Walsh code 1, may be broken up into slots 48, typically of 80 millisecond duration. Each slot may be divided into four frames 34. Each frame 34 is therefore typically 20 milliseconds long. Another recognized frame size is the half frame of 10 ms duration. A message is typically comprised of one or more half frames.

The traffic channel can be composed of 20, 10 or 5 millisecond frames. It should be understood that the content of the frames 34 can differ. One frame may contain a header 36, signaling 38 and data 40 multiplexed on different code channels, another may contain only signaling, and yet another may contain only data. Each frame 34 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS. However, noise and interference in the field may require error correction to determine what was actually transmitted.

Dropped Connections Due to Forward and Reverse Link Fades

In a practical communications network, it is neither realistic nor desirable to target a frame error rate (FER) of zero percent (i.e., all frames received properly). Rather, an FER of one percent, for example, is targeted. Power control loops can be used to maintain a desirable FER. For example, if a reverse link fade (a predetermined number of bad frames) occurs and the FER of transmissions received by the network rises above one percent, then the power control loop might increase the power of signals transmitted by the transmitting MS so that the FER decreases to approximately one percent. Without such power level control, reverse link fades could lead to an excessive FER and dropped connections. On the other hand, if the FER is less than one percent, the power control loop may reduce transmitted power to save power, reduce interference, and allow the FER to move up to one percent.

The BS may therefore continuously instruct the MS, through power control bits in predetermined locations within a frame, to transmit at various power levels to maintain an error rate of approximately one percent. The MS typically abides by the power levels that are being recommended to it by the BS. There are drawbacks, however. When the MS increases its transmit power, the coverage area of the BS is effectively decreased, and also the probability of a MS interfering with other active reverse links is increased.

Figure 4:
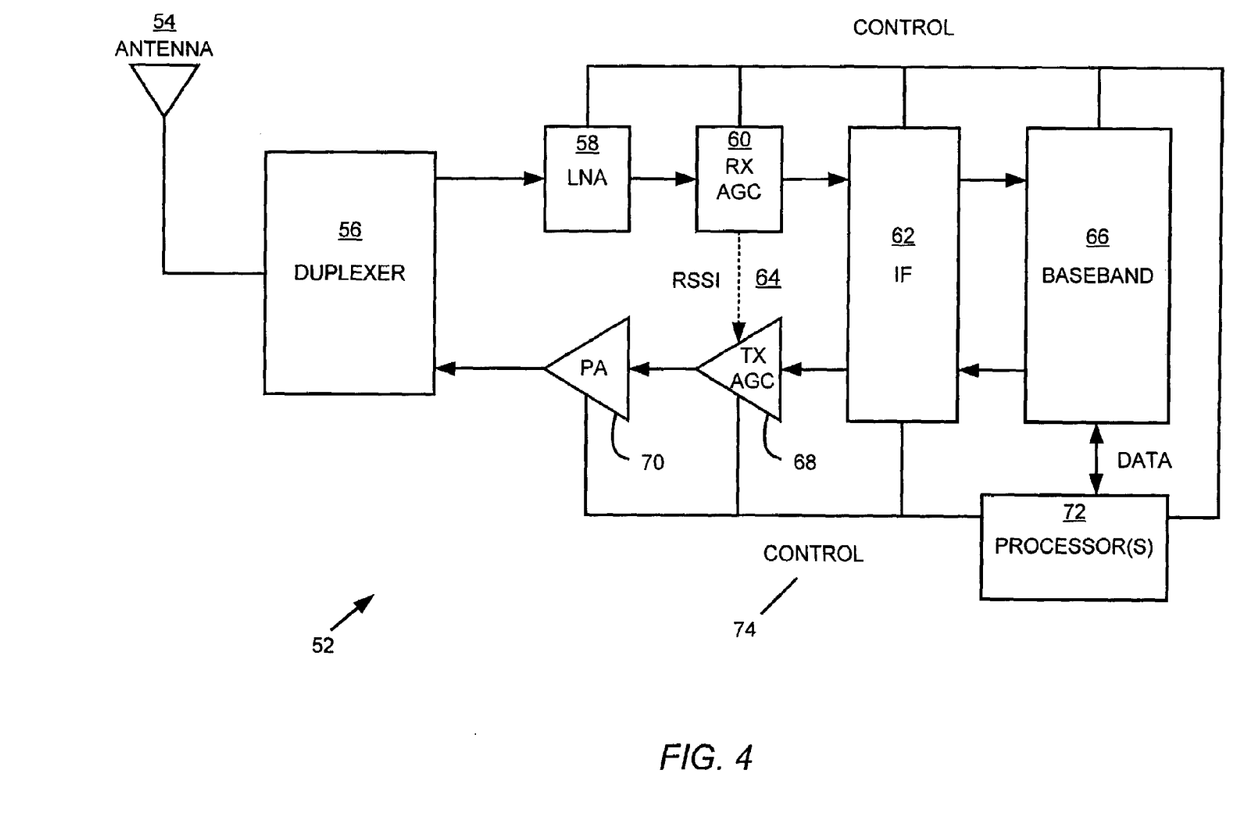
FIG. 4 is a block diagram of a wireless transceiver for use in a wireless communication system.

FIG. 4 is a block diagram of a conventional MS transceiver 52 for illustrating the above-described power control of a MS transmitter. In the receive path, signals received at the antenna 54 are passed through the duplexer 56 and amplified by a low noise amplifier (LNA) 58. The LNA 58 is used for minimizing intermodulation distortion (IMD), which is interference between adjacent carriers. The received signals are then gain-adjusted by a receiver automatic gain control block (AGC) 60 and downconverted to baseband by an intermediate frequency (IF) block 62. Note that the receiver AGC block 60 also measures and generates a received signal strength indicator (RSSI) 64. The baseband signals are processed in a baseband block 66, which contains rake receivers, correlators, interleaving, decoders, and the like. In the transmit path, baseband signals are upconverted by the IF block 62, after which their gain in adjusted by the transmit automatic gain control (TX AGC) block 68 using the RSSI 64 as a part of the overall power control. The IF signals are then amplified by power amplifier PA 70 and passed through the duplexer 56 to the antenna 54. One or more processors 72 provide control for the transceiver 52. Power control bits received from the BS through the receive portion of the MS transceiver 52 are processed by the one or more processors 72 and converted into internal power control bits communicated to the PA 70 over control lines 74 to adjust the MS's transmit power.

In addition, the BS can also change its transmitter power for a particular channel, through similar power control loops, or through threshold or periodic reporting of Forward Link FER. Thus, both the BS and the MS may continuously provide each other feedback in order to change the other's power levels. However, depending on its resource management such as channel power allocation limits, the BS may not necessarily change its transmitter power levels based on the feedback from a given MS.

Despite the aforementioned power control loop, error rates may not be controllable to about one percent at a MS, which has limited transmitter power, moves about in a cellular network and experiences variations in signal strength and signal quality due to physical impediments, interference from adjacent channels, and positions near the edges of sectors. As the error rates rise to intolerable levels, poor and dropped connections become a problem.

Dropped Connections During Call Origination

As described above, when a MS is first powered up, it begins searching for a pilot channel from a BS in a network. When the MS acquires (is able to demodulate) the pilot channel, the timing information implicit in the pilot channel allows the MS to demodulate a sync channel being transmitted by the network. Because the sync channel contains more detailed timing information, once the MS acquires the sync channel, the MS is then able to acquire a paging channel being transmitted by the same BS that is transmitting the pilot channel. Once the MS is able to demodulate the paging channel of a particular BS, the MS may then monitor that paging channel.

Prior to gaining access to the network via the BS, the MS must read certain messages contained in the paging channel. One of the messages is the access parameters message, which tells the MS how the MS is supposed to gain access to the network, how many access probes the MS is allowed to transmit, the incremental power level increase between each retransmitted access probe, and the like. In addition, an open loop power equation dictates the power level of an initial access probe sent by the MS. Generally, if the MS is in a low receive power area, its initial access probe power will be high. If the MS is right next to the BS, the MS's initial access probe power level will be low.

Figure 5:
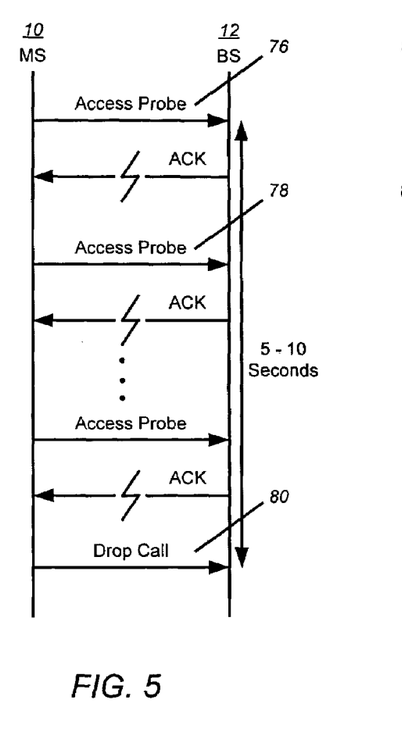
FIG. 5 is a message sequence of access probes that may be retransmitted for a predetermined number of attempts or amount of time during a call origination before the connection is dropped.

When a MS attempts to gain access to the network, it will first send an access probe 76 containing an access channel message, as illustrated in FIG. 5. A typical duration of one access probe is 400 ms. If the access probe 76 is not acknowledged by the BS, the MS will send a second access probe 78 at a higher transmit power. Additional access probes may be transmitted until the BS acknowledges the access probe and the connection is established. However, as noted above, the access parameters message transmitted by the BS may place a limit on how many access probes the MS may send or how much time can be spent retransmitting access probes, before it must give up. In the example of FIG. 5, the call is dropped at 80 because either a predetermined number of access probes have been unsuccessfully transmitted or a timer has expired. Typically, access probes will be repeated for not more than about 5–10 seconds.

However, under certain conditions, within 1–2 seconds of the start of an origination the MS may display a "network busy" message, indicating a connection failure. The elapsed time of only 1–2 seconds indicates that the origination process was not terminated because the number of access probe retransmissions was exceeded, a condition which should occur only after 5–10 seconds have elapsed. Instead, another sequence of events has occurred. The explanation for this problem is described below.

The described problem typically occurs when the MS is on the fringes of the BS's service area and the reverse access channel is not being well-received by the BS. It could also occur in a normal coverage area if the MS is in an area such that its transmit power level is on the verge of needing to be increased, or if a reverse link fade occurs. In any case, the above-described problem typically occurs when the MS's access probe is weak and only marginally being received by the BS.

Figure 6:
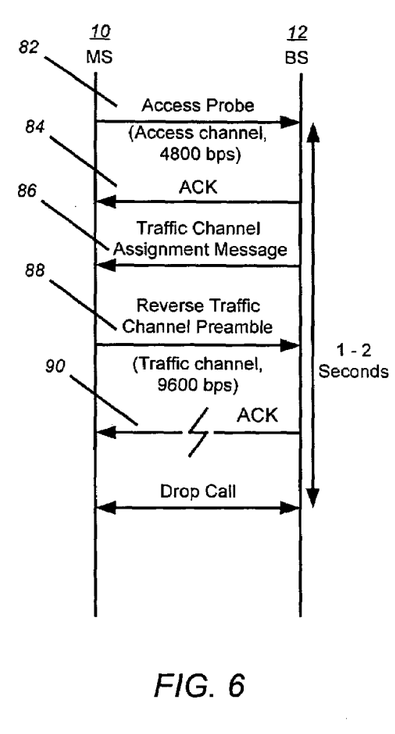
FIG. 6 is a message sequence illustrating a dropped connection due to the base station's failure to acknowledge a reverse traffic channel preamble.

FIG. 6 is a message sequence illustrating a weak access probe 82 as described above, transmitted from MS 10 and only marginally being received by the BS 12. As defined by the standards, the access channel is encoded at a data rate of 4800 bps. Because the initial access probe 82 is received by the BS, albeit marginally, the BS acknowledges the access probe at 84 and also transmits a traffic channel assignment message 86 to the MS, directing the MS to go to a particular traffic channel. After receiving the traffic channel assignment message 86, the MS can then tune to the correct traffic channel orthogonal code and capture the forward traffic channel. The MS then transmits a reverse traffic channel preamble 88 on the reverse traffic channel (a message with known data, such as all zeroes). As defined by the standards, the reverse traffic channel can also carry voice data and is encoded at a data rate of 9600 bps or 14400 bps.

This higher data rate translates into at least a 3–4.7 dB drop in processing gain, which translates into at least a 3–4.7 dB drop in effective power. Thus, the traffic channel is effectively at least 3–4.7 dB lower in power than the access channel. Because the access channel was only marginally being received, the traffic channel with an effective lower power may not be received.

If the reverse traffic channel preamble 88 is nevertheless received by the BS, the BS will acknowledge the preamble, and normal call processing will begin. However, if the reverse traffic channel preamble 88 is not received by the network, and thus not acknowledged (see reference character 90), the MS will drop the connection, the network will then drop the connection, and the MS will see an indication of "network busy." In other words, because there is a loss of 3–4.7 dB in processing gain when the MS transitions from the Access Channel to the Reverse Traffic Channel, calls may be dropped prematurely. Note that the access probe retransmission sequence of FIG. 5 (with a duration of 5–10 seconds) did not take place, because the access probe was in fact received by the BS.

Dropped Connections During Hard Handoffs

As a MS roves through a network and experiences variations in signal strength and signal quality of the communication link associated with the BS(s) that it is in contact with, the MS may be handed off from one BS to another to preserve the connection. During the handoff process, the MS may actually be in communication with multiple BSs or sectors at the same time. For example, in a "soft handoff," a MS in communication with a first BS will begin to communicate with a second BS without first dropping the first BS. In a "softer handoff," a MS in communication with a first sector in a particular BS will begin to communicate with a second sector in the same BS without first dropping the first sector.

Soft and softer handoffs allow a MS to maintain communication with one or more BSs (sectors) simultaneously while the condition of any one of these links is not sufficient to allow successful communication through a single link. This also happens when the MS is moving away from a region served by one BS (sector) into a region that is served by a different BS (sector), to avoid any interruption in the communication between the MS and switching center. Nevertheless, it is not uncommon for a MS to be starting a handoff or in the process of handoff when connections fail and are dropped. This occurs because poor coverage or weak signal environments generally exist near cell boundaries, in areas where the signal to interference ratios change abruptly, in areas of pilot pollution, or areas significantly affected by cell breathing, capacity limitations, network resource availability, and network coverage, all which are well known in the art.

Sometimes a soft or softer handoff is not possible, and instead the MS must perform a "hard hand-off." In a "hard hand-off," a MS in communication with a first BS will begin to communicate with a second BS only after first dropping the first BS. Hard handoffs often require a change in channel frequency, so the communication link with the first BS must first be dropped before a new communication link can be established with the second BS, and only after changing to a new channel frequency.

Before the MS can establish a new communication link with a proposed new BS or sector, current standards require that the MS first evaluate the quality of the proposed new communication link. For example, if the MS is currently using channel X, the MS must leave channel X for a certain period of time, go to new channel Y (i.e. switch channels), evaluate the quality of channel Y, go back to channel X, and report back to the network on the quality of channel Y.

In evaluating the quality of the proposed new link from the new BS, the MS demodulates the pilot channel from that BS. Because the pilot channel transmits zero data at a low data rate, it may appear to be a good quality link and as a result the MS may switch to that BS and bring up a traffic channel. However, even though the link quality may appear to be adequate based on an evaluation of the pilot channel, the quality of the traffic channel may nevertheless be poor or marginal, because the traffic channel transmits variable data at a lower power level and a different data rate. If the new traffic channel has insufficient link quality, the call may be dropped.

The previously described problems of dropped connections due to reverse link fades and dropped connections during call origination can be minimized by allowing a MS to transmit reverse traffic channel data using dynamically adjustable data rates. In addition, the previously described problem of dropped connections during hard handoffs can be minimized by using dynamically adjustable data rates to evaluate the new forward or reverse link. Therefore, a need exists for a method and apparatus that allows the MS to transmit reverse link channels using dynamically adjustable data rates.

SUMMARY OF THE INVENTION

Embodiments of the present invention allow the transmission bit stream of the Forward and Reverse Link Channels to become dynamic under controlled conditions in such a way as to take advantage of the inherit strengths that the concept of processing gain provides and thereby improve the probability of establishing and maintaining the Forward and Reverse Traffic Channel.

Dropped connections due to forward and reverse link fades and dropped connections during call origination are minimized by allowing a MS to transmit reverse traffic channel data using dynamically adjustable data rates. In addition, dropped connections during hard handoffs are minimized by using a special code channel and dynamically adjustable data rates to evaluate the proposed new link.

During call origination, after receiving a traffic channel assignment message, the MS tunes to the correct traffic channel orthogonal code and captures the forward traffic channel. The MS then transmits a reverse traffic channel preamble on the reverse traffic channel. The MS brings up the traffic channel (including the reverse traffic channel preamble) at a lower available data rate. At a lower rate, there is more effective power per bit in the traffic channel, and therefore more chance of being received by the BS. Then, based on the frame error rates (FER) seen by the BS, the BS directs the MS to gradually increase the data rates at frame boundaries to test the quality of the link and ensure that the call can be established correctly.

By starting the traffic channel at a lower data rate (effectively at a higher power), the reverse traffic channel preamble should be received and acknowledged by the BS, preventing an early dropped call and a "network busy" message. The call can therefore be held without being dropped for a short period of time until the poor channel environment has improved. However, if the poor channel environment does not improve, the call may be kept open (at the lower data rates) but it will provide degraded voice activity, or none at all. Therefore, a timer may be maintained for dropping the call if the MS has not increased the traffic channel data rate to the full rate (for voice communications) after a predetermined amount of time has elapsed.

During a reverse link fade, the effective power level of a MS transmission can be increased by lowering the data rate, which can also decrease the FER and lead to fewer dropped connections. Although the power levels aren't changing, because the data is persisting for a longer time, the receiver is more likely to be able to receive it properly. When there are no voice communications over the reverse link, the MS will repeatedly transmit one of the frames eight times, thereby effectively increasing the processing gain and effective transmit power and making the reverse traffic channel easier for the BS to receive.

If an increase in FER is detected by the BS, such as when a reverse link fade is occurring, the BS can direct the MS to increase the gated "on time" of its transmitter while maintaining the reverse traffic channel bit stream to a constant value. In other words, the MS will repeat frames of data within a frame. This will result in a choppy sound, but will effectively increase the processing gain and effective transmit power and make the reverse traffic channel easier for the BS to receive. Alternatively, the BS can direct the MS to temporarily lower the data transmission rate of the reverse traffic channel bit stream at the next frame boundary. Voice communications will not be possible, but because the effective processing gain and effective transmit power level is increased, the chance of getting through the reverse link fade without dropping the connection will be increased. As soon as the FER improves, the data rate can be increased at the next frame boundary. Again, a timer can be employed to drop the call if the reverse link fade and an unacceptable FER persists beyond a predetermined time.

When a "hard hand-off" is performed, a separate code channel instead of the pilot channel may be used to step through various data rates and perform an active characterization of the proposed link. To perform the characterization, embodiments of the present invention may simultaneously transmit a Markov call (a number progression), adapted to CDMA, between the MS to the BS or the BS to the MS. Because the MS and the BS both know what data the other will send, and at what time the data will be sent, a frame-by-frame comparison can be made of the forward and reverse link. This characterization may be performed over a range of data rates, and FER values may be determined for each data rate and for each link. The network may process this data and then determine whether the proposed new link should be used in the hard handoff.

These and other features and advantages of embodiments of the present invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may primarily reference the CDMA communication protocol (code-based protocols) and the communication of messages for purposes of explanation only, embodiments of the present invention are applicable to other communication protocols and digital radio technologies generally, and include, but are not limited to, CDMA, TDMA, FDMA, GSM, GPRS, and the like.

Embodiments of the present invention minimize the previously described problems of dropped connections due to reverse link fades and dropped connections during call origination by allowing a MS to transmit reverse traffic channel data using dynamically adjustable data rates. In addition, embodiments of the present invention minimize the previously described problem of dropped connections during hard handoffs by using a special code channel and dynamically adjustable data rates to evaluate the proposed new link.

Dynamically Adjustable Data Rates During Call Originations

As described above, calls may be dropped prematurely during call originations when the reverse access channel (e.g. at 4800 bps) from the MS is only marginally received by the BS, because the loss of about 3–4.7 dB in processing gain in the reverse traffic channel due to the higher data rates of the traffic channel (e.g. at 9600 bps) may prevent the reverse traffic channel preamble from being received by the BS.

Figure 7:
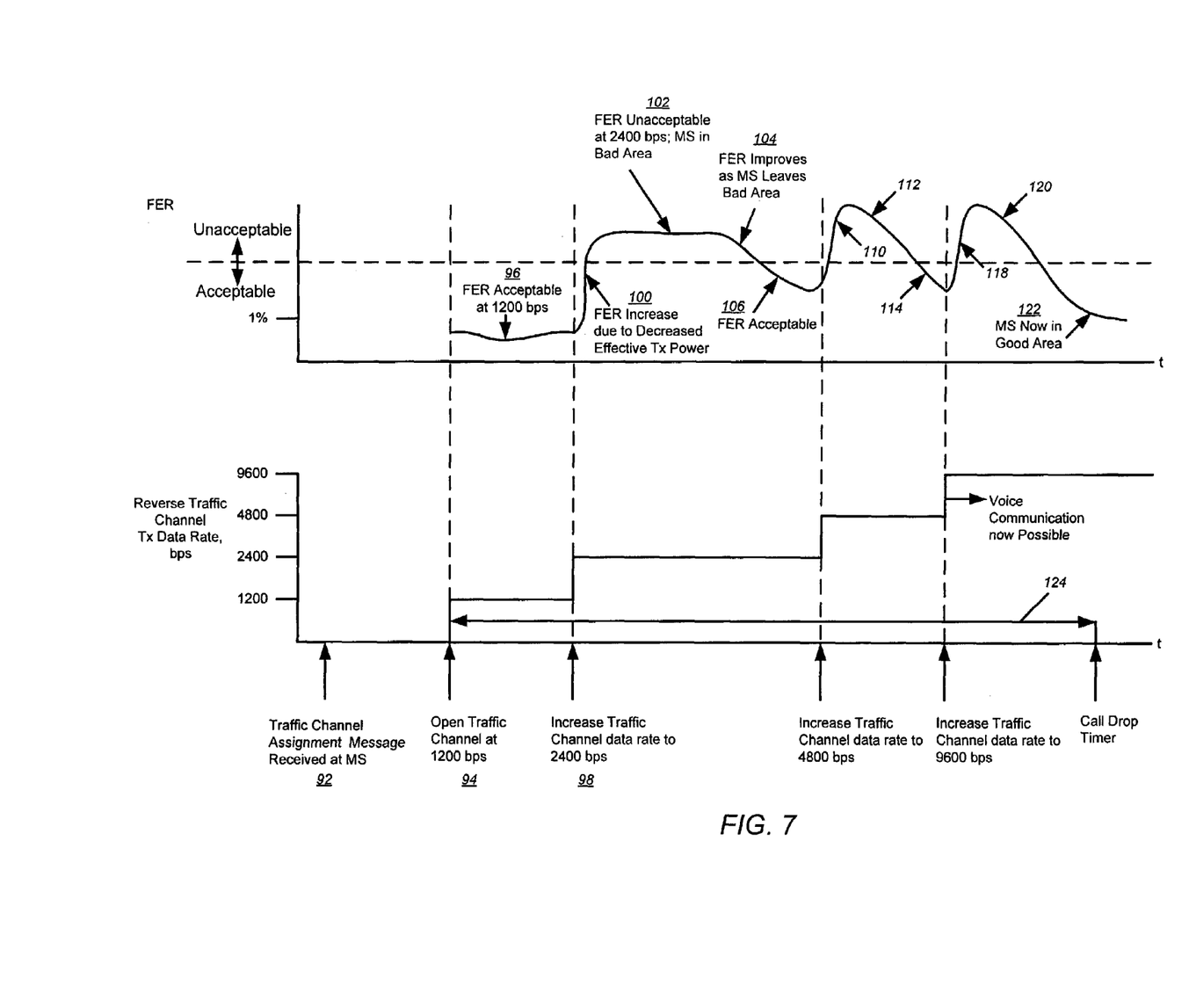
FIG. 7 is an exemplary diagram illustrating adjustments to the data rate of the reverse traffic channel as a function of the FER during a call origination according to an embodiment of the present invention.

FIG. 7 is an exemplary diagram illustrating adjustments to the data rate of the reverse traffic channel as a function of the FER according to an embodiment of the present invention. After receiving a traffic channel assignment message at 92, the MS can tune to the correct traffic channel orthogonal code and capture the forward traffic channel. The MS then transmits a reverse traffic channel preamble on the reverse traffic channel (a message with known data, such as all zeroes). Embodiments of the present invention direct the MS to bring up the traffic channel (including the reverse traffic channel preamble) at a standby or lower available data rate such as 1200 bps at time 94. At a lower rate, there is more effective power per bit in the traffic channel, and therefore more chance of being received by the BS. The MS transmitter still performs as if the bit stream were still encoded at 9600 bps. This lower data rate ensures that the reverse traffic channel preamble (at 1200 bps) has greater processing gain than any access channel message (at 4800 bps), ensuring the establishment of the reverse traffic channel, even during a reverse link fade.

Then, based on the frame error rates (FER) seen by the BS, in one embodiment the BS transmits a message to the MS, directing the MS to gradually increase the data rates at frame boundaries to 2400 bps, 4800 bps, and finally to 9600 bps to test the quality of the link and ensure that the call can be established correctly. Alternatively, the FER itself may be transmitted to the MS, and a MS processor will determine if the data rate should be increased. Another reason for stepping up from a standby rate of 1200 bps to 9600 bps through a few transition rates (2400, 4800 bps) is to conserve power and reduce computational complexity, because if the data rate jumped directly from 1200 bps to 9600 bps, the MS processors would have difficulty performing the translation.

Note that because 9600 bps is the rate at which voice data is transmitted (the voice data rate), until the data rate is increased to 9600 bps, typically voice communications are degraded. However, by starting the traffic channel at a lower data rate (effectively at a higher power), the reverse traffic channel preamble should be received and acknowledged by the BS, preventing an early dropped call and a "network busy" message. Thereafter, the MS can begin to incrementally increase the traffic channel data rate as long as the FER measured by the BS is acceptable. If the channel environment is good, the FER will be low and the MS can quickly raise the data rate to 9600 bps, and voice communications can begin. If the channel environment is poor, the FER will be high and the MS will delay in increasing the traffic channel data rate. This delay allows the call to be held without being dropped for a short period of time until the poor channel environment has hopefully improved (e.g. because the user has moved out of that region). However, if the poor channel environment does not improve (e.g. if the user stays in the same area, or if the user is traveling in a path that parallels a fringe area such that the user remains in a poor area for an extended period of time), the call may be kept open (at the lower data rates) but provide degraded voice activity or none at all for a long period of time. Therefore, embodiments of the present invention establish a timer or other mechanism for dropping the call if the MS has not increased the traffic channel data rate to 9600 bps after a predetermined amount of time.

In the example of FIG. 7, when the reverse traffic channel is first established at 1200 bps at time 94, the resulting FER determined by the BS at 96 is within an acceptable range, so the BS directs the MS (through a forward link message) to increase the reverse traffic channel data rate to 2400 bps at the next frame boundary 98. This data rate increase effectively decreases the transmit power level, and as a result, the FER may increase. In the example of FIG. 7, the FER is pushed up to an unacceptable range at 100. The poor channel environment persists during time 102, keeping the FER at an unacceptable level. Although not shown in FIG. 7, in embodiments of the present invention if the FER persists at an unacceptable level the BS may direct the MS to drop back down to a lower data rate, or may drop the call. In addition, power control bits (closed loop power control) may be used to bring down the FER.

At time 104 the channel environment begins to improve, and the FER reaches an acceptable level at time 106. The MS is therefore directed to increase the data rate to 4800 bps at the next frame boundary 108, again causing the FER to be pushed up to an unacceptable range at 110. Because the channel environment continues to improve in this example, the FER drops at 112 and again reaches an acceptable level at 114. The MS is again directed to increase the data rate to 9600 bps at the next frame boundary 116, at which time voice communications can begin. However, the increased data rate once again causes the FER to be pushed up to an unacceptable range at 118, so voice communications are degraded. Because the channel environment continues to improve in this example, the FER drops at 120 and reaches a preferred level of 1% at 122. Although not shown in FIG. 7, if the channel environment did not improve, the BS may direct the MS to drop back down to 4800 bps. Note that in the example of FIG. 7, if the data rate had not been raised from 1200 bps to 9600 bps before a wait time 124 elapsed, the connection would have been dropped.

It should be understood that although embodiments of the present invention were described hereinabove for purposes of illustration only in terms of an "8k call" having possible incremental data rates of 1200, 2400, 4800, and 9600 bps, there are actually two distinct systems or services, one that provides "8k calls" and another that provides "13k calls" of higher clarity and having possible incremental data rates of 1800, 3600, 7200, and 14400 bps. Either service is applicable to embodiments of the present invention. The MS is directed to use one of these two services in the channel assignment message. The service used can vary from call to call.

Dynamically Adjustable Data Rates During Reverse Link Fades

As described above, if a reverse link fade occurs and the FER of transmissions received by the network rises, the MS transmit power level may be increased so that the network can more easily receive reverse link transmissions, resulting in a decreased FER. Without such power level control, reverse link fades could lead to an excessive FER and dropped connections.

Embodiments of the present invention provide another means of increasing the effective power level of a MS transmission by lowering the data rate, which can also decrease the FER and lead to fewer dropped connections. An example is illustrative. Dividing the spread rate of CDMA (1.288 MHz) by an exemplary transmission data rate of 9600 bps results in 21.07 dB of processing gain. Note that the spread rate is the chip rate. Assume that a receiver needs 6 dB of processing gain above the noise floor to operate correctly. Any less that that, and there will likely be too many frame errors, and the receiver won't be able to receive the channel. To ensure adequate processing gain, the transmission data rate can be decreased, thereby increasing the processing gain. It is therefore possible to compensate for a lack of transmission power by decreasing the data rate. In other words, although the power levels aren't changing, because the data is persisting for a longer time, the receiver is more likely to be able to receive it properly.

Figure 8A:
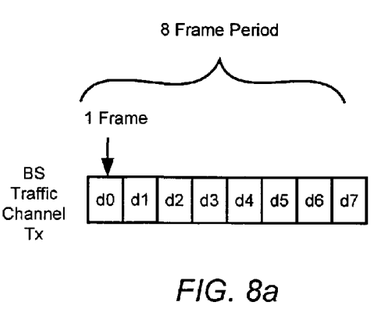
FIG. 8a shows eight voice data frames d0 through d7 transmitted when voice data is present on the forward link.

Voice data is typically transmitted over the traffic channel in frames at a full rate (e.g. 9600 bps). With regard to the forward traffic channel, as long as the person talking to the MS user continues to talk, each frame contains unique voice data and is transmitted at the full rate. FIG. 8a shows eight frames of normal voice data d0 through d7 being transmitted over the traffic channel.

Figure 8B:
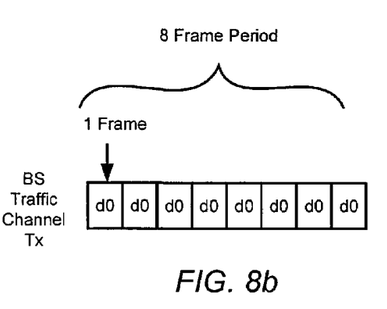
FIG. 8b shows eight repeated frames d0 transmitted when no voice data is present on the forward link.

However, if the person talking to the MS user stops talking or mutes the telephone, the BS will transition to an "eighth rate" mode and repeatedly transmit one of the frames eight times. FIG. 8b shows eight frames of blank voice data, wherein frame d0 is repeated eight times. Although the actual data rate is unchanged, the repeated frames increase the processing gain and the effective transmit power and makes the forward traffic channel easier for the MS to receive. Thus, if the user of the MS thinks a forward link fade is about to occur, the user can tell the other person to stop talking, and because the effective processing gain and effective transmit power of the forward traffic channel is increased, it may be possible to get through the fade without dropping the connection.

Figure 8C:
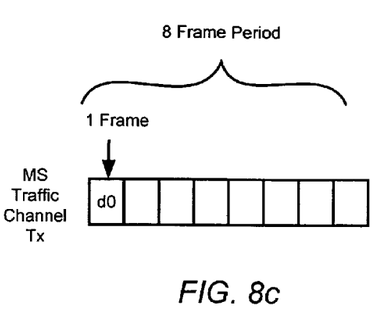
FIG. 8c shows one frame d0 transmitted over a time period representing eight frames when no voice data is present on the reverse link.

With regard to the reverse traffic channel, as long as the user of the MS is talking, each frame contains unique voice data and is transmitted at the full rate. However, if the user stops talking or mutes the telephone, the MS will also drop to an "eighth rate" mode (e.g. 1200 bps) for purposes of battery conservation and transmit one frame every eight frames. FIG. 8c shows a time period representing eight frames, wherein only voice data frame d0 is transmitted within the time period representing eight frames. However, because the frame d0 is not repeated eight times, as in FIG. 8b, the processing gain and effective transmit power are not increased. Thus, if a reverse link fade is expected, having the user keep silent will not improve the chance of getting through the fade without dropping the connection.

Figure 8D:
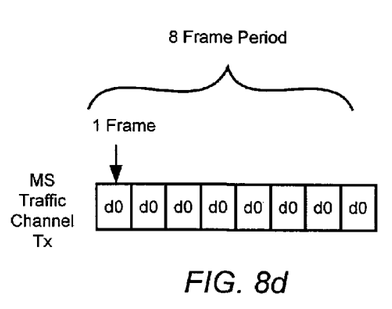
FIG. 8d is an exemplary diagram showing eight repeated frames d0 transmitted when no voice data is present on the reverse link according to an embodiment of the present invention.

One embodiment of the present invention modifies existing processes such that when a MS user stops talking or mutes the telephone (i.e. when the reverse traffic channel is inactive), the MS will repeatedly transmit one of the frames eight times, thereby effectively increasing the processing gain and effective transmit power and making the reverse traffic channel easier for the BS to receive. FIG. 8d shows eight frames of blank voice data, wherein frame d0 is repeated eight times according to an embodiment of the present invention.

In another embodiment of the present invention, if an increase in FER is detected by the BS, such as when a reverse link fade is occurring, the BS can direct the MS to increase the "gated on time" of its transmitter while maintaining the reverse traffic channel bit stream to a constant value. In other words, the MS will repeat data frames. This will effectively increase the processing gain and effective transmit power and make the reverse traffic channel easier for the BS to receive. FIG. 8d is also representative of this embodiment of the present invention.

Figure 9:
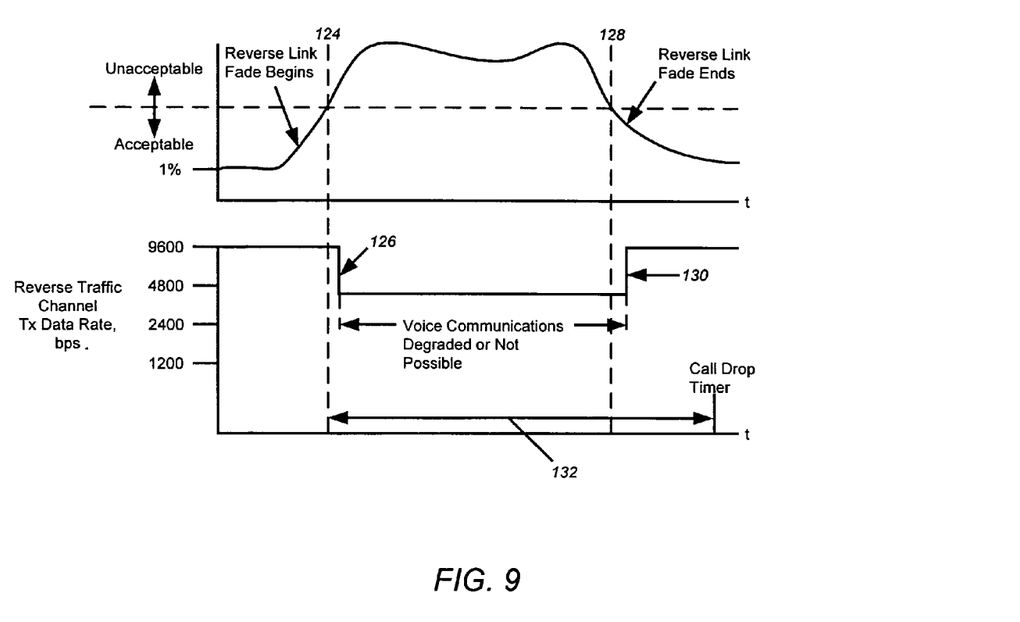
FIG. 9 is a an exemplary diagram illustrating how the MS can adjust its data rate in response to an increase in the FER during a reverse link fade according to an embodiment of the present invention.

In yet another embodiment of the present invention illustrated in FIG. 9, if an increase in FER is detected by the BS at 124, such as when a reverse link fade is occurring, the BS can direct the MS to temporarily lower the data transmission rate of the reverse traffic channel bit stream at the next frame boundary 126 to a rate such as 4800, 2400, or 1200 bps (4800 in the example of FIG. 9). Voice communications will be degraded or not possible while the data rate is below 9600 bps, but because the effective processing gain and effective transmit power level is increased, the chance of getting through the reverse link fade without dropping the connection will be increased. As soon as the FER improves at 128, the data rate can be increased to 9600 bps at the next frame boundary 130. Again, a timer can be employed to drop the call if the reverse link fade and an unacceptable FER persists beyond a predetermined time 132.

Although embodiments of the present invention described hereinabove refer primarily to dynamically adjusting the data rates of reverse traffic channels, it should be understood that other types of channels, including forward channels, fall within the scope of the present invention.

Dynamically Adjustable Data Rates During Hard Handoffs

As described above, when a "hard hand-off" is performed, a MS in communication with a first BS will begin to communicate with a second BS only after first dropping the first BS. Before the MS can establish a new communication link with the second BS, current standards require that the MS first evaluate the quality of the new communication link by evaluating the quality of the pilot channel from the second BS. However, because the pilot channel transmits-zero data at a low data rate, it may appear to be a good quality link when in fact the quality of the corresponding traffic channel may be marginal or poor, because the traffic channel transmits variable data at a lower power level and a different data rate. If the new communication link is established based on the evaluation of the pilot channel, but the traffic channel has insufficient quality, the call may be dropped.

Embodiments of the present invention utilize one or more separate code channels identified herein as a link evaluation channels instead of the pilot channel to step through various data rates and perform an active characterization of the proposed link. To perform the characterization in the hard handoff scenario, embodiments of the present invention first direct the MS to temporarily drop its present connection with the first BS and establish a connection between the MS and the second BS. The MS and the second BS may then transmit a Markov call (a number progression), adapted to CDMA, or other link evaluation sequences well understood by those skilled in the art, over reverse and forward link evaluation channels. Because the MS and the BS both know what data the other will send, and at what time the data will be sent, a frame-by-frame comparison can be made of the forward and reverse link. Note that each link can be evaluated separately. This characterization may be performed over a range of data rates (e.g. 1200, 2400, 4800 and 9600 bps), traffic channel settings, and FER values may be determined for each data rate and for each link. The MS then drops the connection with the second BS and reestablishes a connection with the first BS, while the network or MS processes the collected FER data and determines whether the second BS should be used in the hard handoff.

Although the use of dynamic data rates for link evaluation was described above with regard to hard handoffs, it should be understood that this link evaluation embodiment may be employed whenever it is desirable to evaluate a proposed new connection.

Furthermore, although the methodologies for dynamically controlling reverse link channel processing gain to minimize the chance for dropped connections and improve the quality of hard handoffs described hereinabove used a cellular network as an example, the basic concepts of the described embodiments of the present invention are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, a Telematics modem, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network of base stations (BSs) and a mobile station (MS) for establishing a connection and maintaining one or more communication channels between them, a method for minimizing dropped connections between the MS and one of the BSs, comprising:
   determining a frame error rate (FER) of a communication channel being maintained between the MS and the BS, the communication channel being a reverse traffic channel;
   increasing a processing gain of the communication channel by decreasing a data rate of the communication channel if the FER is within an unacceptable range; and
   during call origination,
      initially transmitting the reverse traffic channel at a standby data rate lower than a voice data rate, and
      incrementally increasing the standby data rate if the FER is within an acceptable range until the standby data rate is increased to the voice data rate.

2. The method as recited in claim 1, wherein the standby rate is initially selected to be lower than a MS access channel data rate.

3. The method as recited in claim 1, further comprising:
   maintaining a call drop timer that starts when the reverse traffic channel is first transmitted at the standby data rate; and
   dropping the connection if the call drop timer expires before the standby data rate is increased to the voice data rate.

4. In a system comprising a network of base stations (BSs) and a mobile station (MS) for establishing a connection and maintaining one or more communication channels between them, the MS having a current connection with a first BS and a proposed new connection to a second BS is being evaluated for a hard handoff, a method for evaluating a quality of the connection between the MS and the second BS, comprising:
   assigning code channels as forward and reverse link evaluation channels for performing an active characterization of the connection;
   temporarily dropping the connection between the MS and the first BS;
   establishing a temporary connection between the MS and the second BS;
   transmitting and receiving a known number progression across the forward and reverse link evaluation channels for each data rate in a sequence of data rates;
   determining a frame error rate (FER) for each forward and reverse link evaluation channel at each data rate;
   dropping the temporary connection between the MS and the second BS;
   reestablishing the connection between the MS and the first BS; and
   determining whether the proposed new connection should be used in the hard handoff based on the FER for each forward and reverse link evaluation channel at each data rate over the temporary connection.

5. A mobile station (MS) for communicating with a base station (BS) in a network of BSs via forward and reverse link channels, the BS for determining a frame error rate (FER) of the reverse link channel to assist in minimizing the chance of a dropped connection, the MS comprising:
   a MS processor programmed for
      receiving an indication of the FER of the reverse link channel, the reverse link channel being a reverse traffic channel,
      increasing a processing gain of the reverse link channel if the indication of the FER shows that the FER is within an unacceptable range,
      increasing the processing gain of the reverse link channel by decreasing a data rate of the reverse link channel, and
      during call origination,
         initially transmitting the reverse traffic channel at a standby data rate lower than a voice data rate, and
         incrementally increasing the standby data rate if the indication of the FER shows that the FER is within an acceptable range, until the standby data rate is increased to the voice data rate.

6. The MS as recited in claim 5, wherein the standby rate is initially selected to be lower than a MS access channel data rate.

7. The MS as recited in claim 5, the MS processor further programmed for:
   maintaining a call drop timer that starts when the reverse traffic channel is first transmitted at the standby data rate; and
   dropping the connection if the call drop timer expires before the standby data rate is increased to the voice data rate.

8. A mobile station (MS) for establishing a connection with a base station (BS), communicating with the BS via forward and reverse link channels, and evaluating a quality of the connection, the MS having a current connection with a first BS and a proposed new connection to a second BS is being evaluated for a hard handoff, the MS comprising:
   a MS processor programmed for
      establishing reverse and forward link evaluation channels for performing an active characterization of the connection;
      temporarily dropping the connection between the MS and the first BS;
      establishing a temporary connection between the MS and the second BS;
      transmitting a first known number progression across the reverse link evaluation channel and receiving a second known number progression across the forward link evaluation channel for each data rate in a sequence of data rates;
      determining a frame error rate (FER) for the forward link evaluation channel at each data rate;
      dropping the temporary connection between the MS and the second BS;
      reestablishing the connection between the MS and the first BS; and
      determining whether the proposed new connection should be used in the hard handoff based on the FER for the reverse link evaluation channel at each data rate over the temporary connection.

9. A network of base stations (BSs) for establishing a connection with a mobile station (MS), communicating with the MS via forward and reverse link channels, and evaluating a quality of the connection, the MS having a current connection with a first BS in the network and a proposed new connection to a second BS in the network is being evaluated for a hard handoff, the network comprising:
   a network processor programmed for
      establishing forward and reverse link evaluation channels for performing an active characterization of the connection;

temporarily dropping the connection between the MS and the first BS;

establishing a temporary connection between the MS and the second BS;

transmitting a first known number progression across the forward link evaluation channel and receiving a second known number progression across the reverse link evaluation channel for each data rate in a sequence of data rates;

determining a frame error rate (FER) for the reverse link evaluation channel at each data rate;

dropping the temporary connection between the MS and the second BS;

reestablishing the connection between the MS and the first BS; and determining whether the proposed new connection should be used in the hard handoff based on the FER for the forward link evaluation channel at each data rate over the temporary connection.

* * * * *